No. 695,806. Patented Mar. 18, 1902.
C. M. FENTON & A. WODE, Jr.
MACHINE FOR CUTTING GREEN CORN FROM THE COB.
(Application filed Mar. 11, 1901.)
(No Model.) 4 Sheets—Sheet 1.
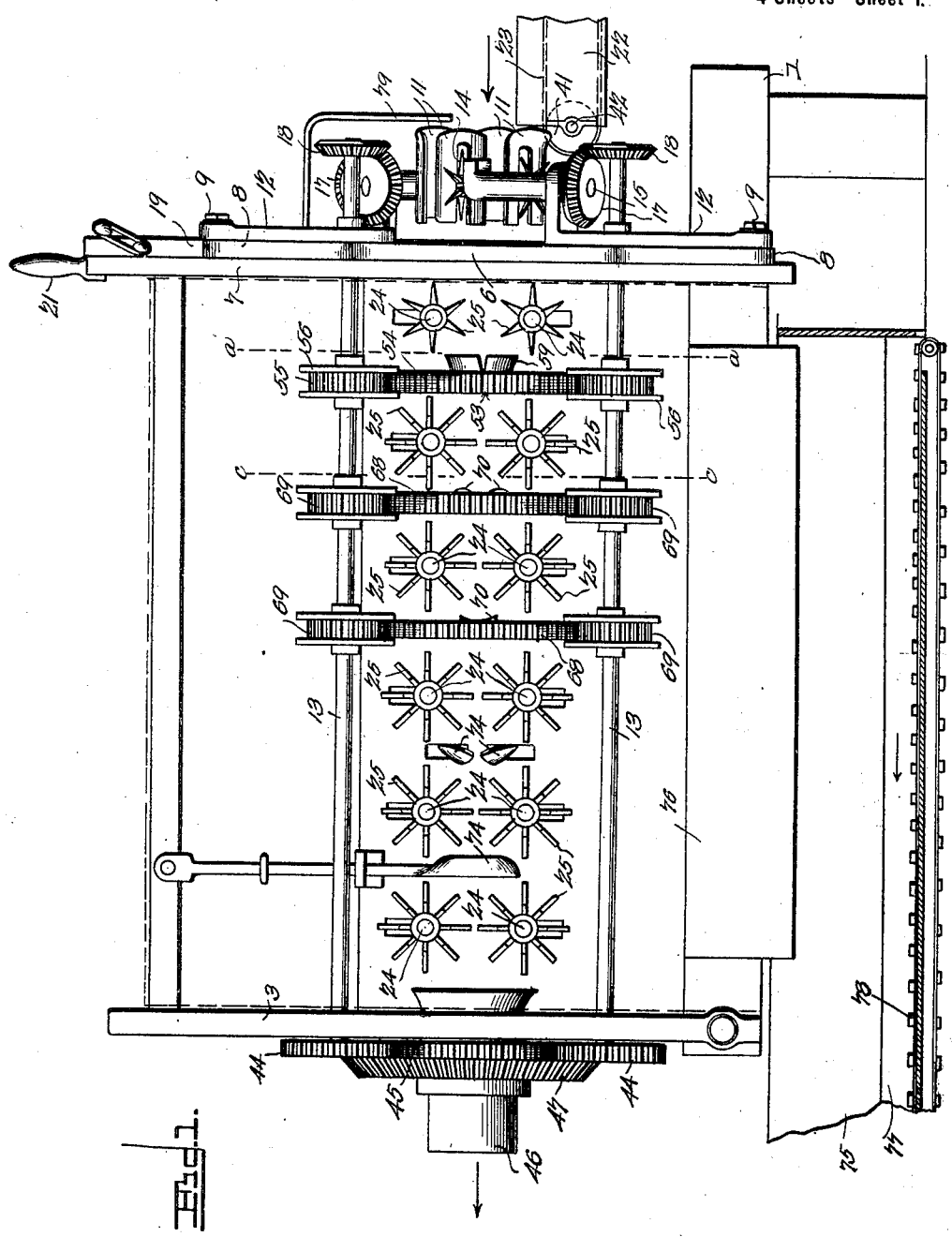
Witnesses
Clarence M. Fenton
Adam Wode, Jr. Inventors
Attorneys No. 695,806. Patented Mar. 18, 1902.
C. M. FENTON & A. WODE, Jr.
MACHINE FOR CUTTING GREEN CORN FROM THE COB.
(Application filed Mar. 11, 1901.)
(No Model.) 4 Sheets—Sheet 2.
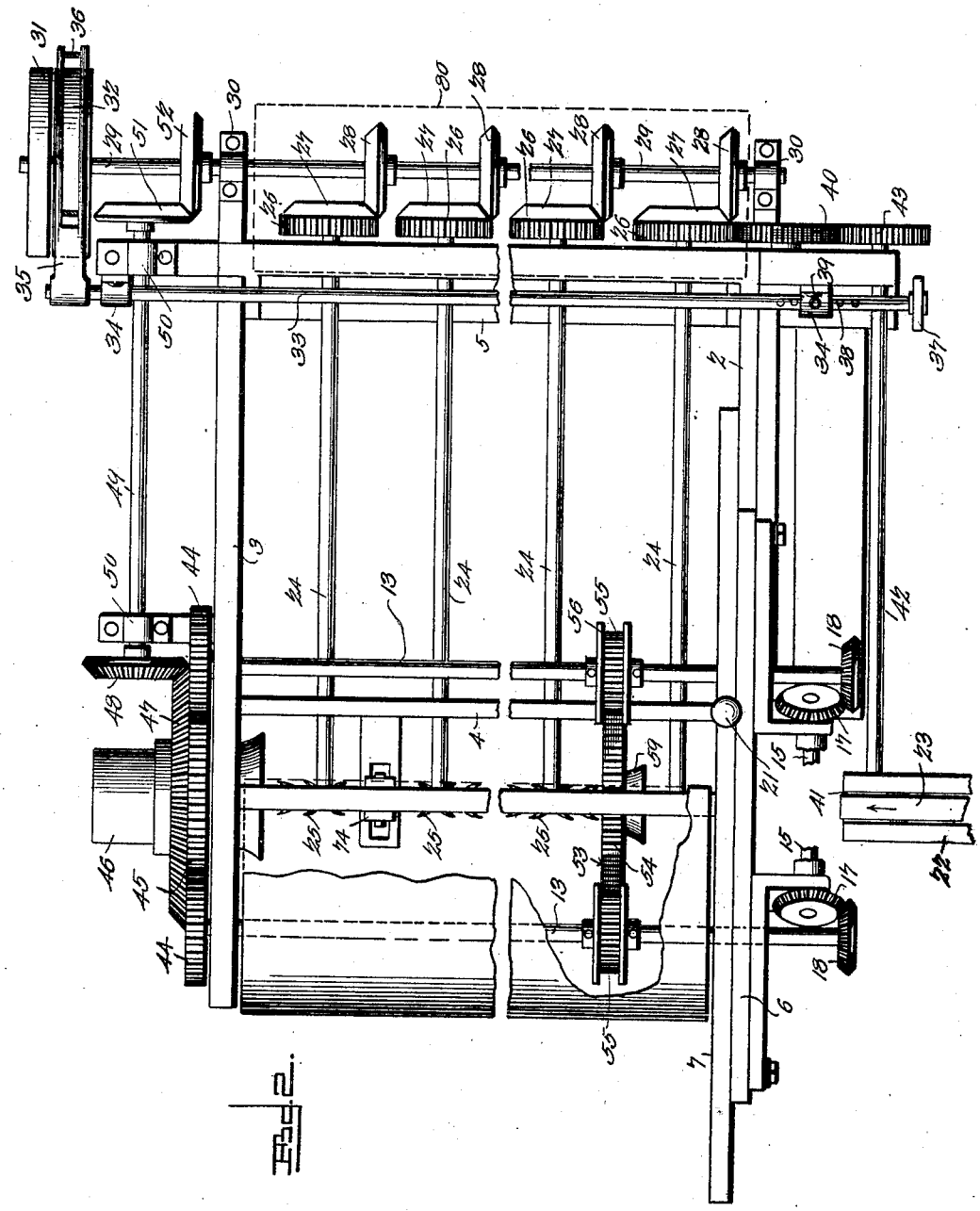

No. 695,806. Patented Mar. 18, 1902.
C. M. FENTON & A. WODE, Jr.
MACHINE FOR CUTTING GREEN CORN FROM THE COB.
(Application filed Mar. 11, 1901.)
(No Model.) 4 Sheets—Sheet 3.
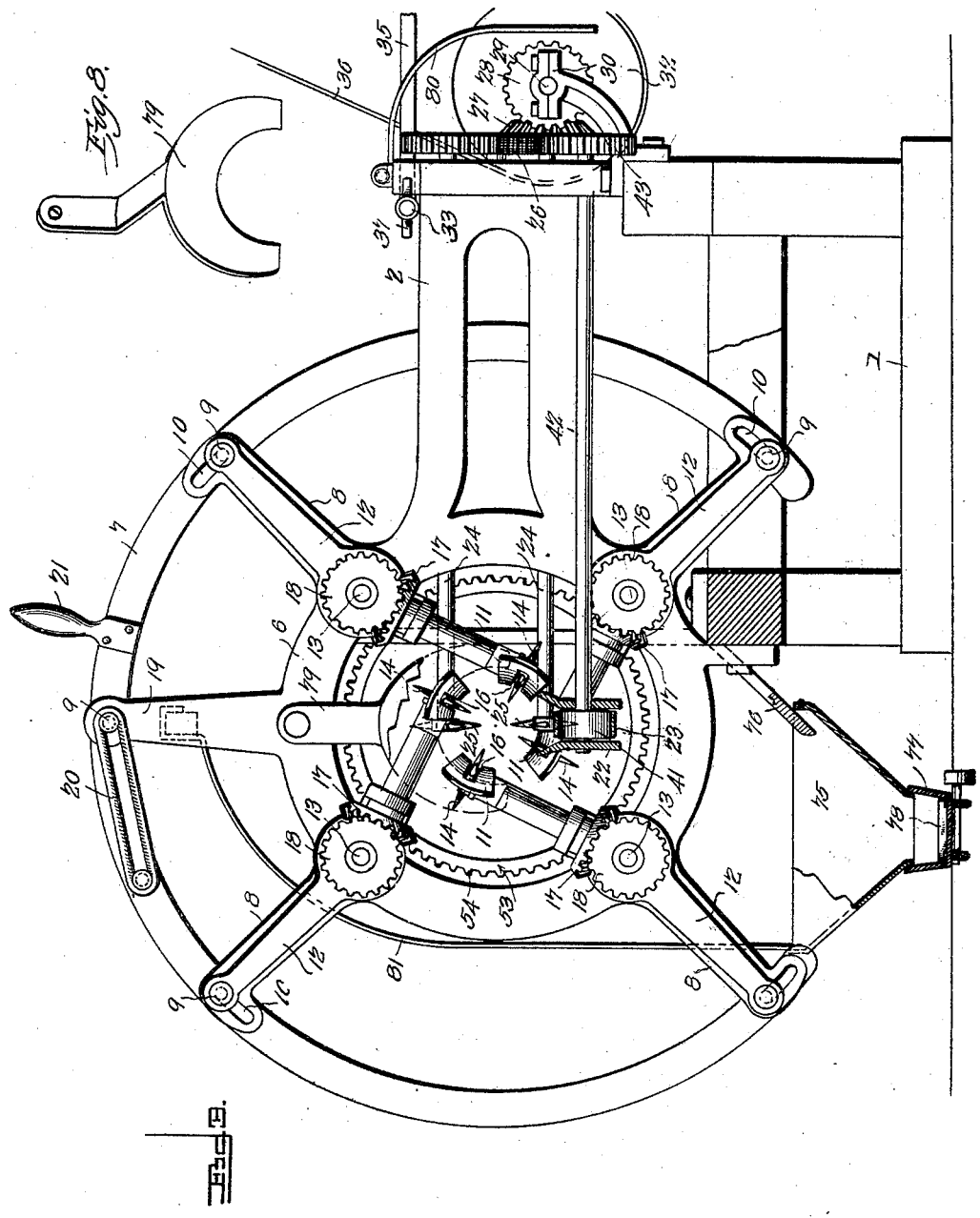

No. 695,806. Patented Mar. 18, 1902.
C. M. FENTON & A. WODE, Jr.
MACHINE FOR CUTTING GREEN CORN FROM THE COB.
(Application filed Mar. 11, 1901.)
(No Model.) 4 Sheets—Sheet 4.
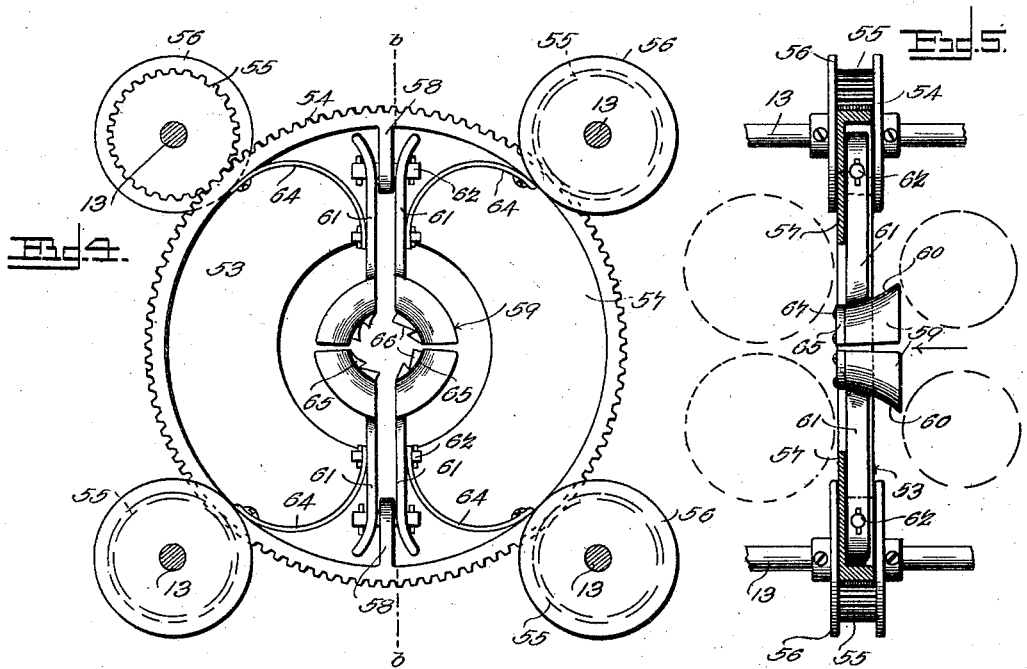

UNITED STATES PATENT OFFICE.

CLARENCE M. FENTON, OF BUFFALO, AND ADAM WODE, JR., OF NORTH COLLINS, NEW YORK; SAID WODE ASSIGNOR TO SAID FENTON.

MACHINE FOR CUTTING GREEN CORN FROM THE COB.

SPECIFICATION forming part of Letters Patent No. 695,806, dated March 18, 1902.

Application filed March 11, 1901. Serial No. 50,699. (No model.)

*To all whom it may concern:*

Be it known that we, CLARENCE M. FENTON, residing at Buffalo, and ADAM WODE, Jr., residing at North Collins, in the county of Erie and State of New York, citizens of the United States, have invented a new and useful Machine for Cutting Green Corn from the Cob, of which the following is a specification.

Our invention is an improved machine for cutting green corn from the cob; and it consists in the peculiar construction and combination of devices hereinafter fully set forth and claimed.

Our invention relates particularly to improved means for splitting the skins or hulls constituting the outer integument of the grains and for expressing the meats or kernels therefrom, leaving the skins or hulls of the grains, which are indigestible, on the cobs, while securing all the pulp and kernels constituting the meats and also the milk from the grains for canning purposes.

In the accompanying drawings, Figure 1 is a side elevation, partly in section, of a machine for cutting green corn from the cob, constructed in accordance with our invention. Fig. 2 is a top plan view of the same. Fig. 3 is a front elevation of the same, partly in section. Fig. 4 is a diagrammatic section taken on a plane indicated by the line *a a* in Fig. 1. Fig. 5 is a detail section taken on a plane indicated by the line *b b* of Fig. 4. Fig. 6 is a diagrammatic section taken on a plane indicated by the line *c c* of Fig. 1. Fig. 7 is a detail perspective view of one segment of the cutter for splitting the grains of corn on the cob. Fig. 8 is a detail perspective view of the shield, which is disposed in advance of the guide-plates to prevent the fingers of the operator from becoming caught by the feed-wheels.

In its general construction the machine here shown resembles that described in Letters Patent of the United States No. 256,926, granted to Welcome Sprague April 25, 1882.

The base 1 of the machine, the front frame 2, the rear frame 3, and the side frames 4 5 are constructed as described in the aforesaid Letters Patent. The front frame 2 is provided with a stationary ring 6, arranged concentric with and at right angles to the line in which the ears of corn travel through the machine and which is secured to or formed in one piece with the frame 2. The rear frame 3 is provided with a similar ring or perforated plate. A movable ring or ring-segment 7 surrounds the ring 6 and is connected to radial arms 8, projecting from the frame or ring 2, by bolts 9, which move in concentric slots 10, formed in the ends of the arms 8 and made sufficiently long to permit of the requisite oscillatory movement of the outer ring 7. Four curved guide-plates 11 are attached to the inner ends of arms 12, which are arranged on the front side of the ring 6, equidistant around the center thereof. The arms 12 are pivoted to the ring 6 by four horizontal shafts 13, which are journaled in the rings or frames 2 3. A pointed serrated or toothed feed-wheel 14 is secured on the inner end of each of a series of shafts 15, which turn in sockets or bores formed in the inner portions of the arms 12. The said feed-wheels are arranged radially around the center of the ring 6 and project inwardly through slots 16, formed in the guide-plates 11. The shafts 15, to which said feed-wheels are secured, are driven from the shafts 13 by beveled wheels 17 18. The outer ends of the arms 12 extend to the ring 7 and are connected therewith by the bolts 9, which operate in the slots 10, so that an oscillatory movement of the ring 7 will cause all of the arms 12 to turn simultaneously on shafts 15. The outer ring 7 is connected with a fixed arm 19 of the inner ring 6 by a spring 20, which becomes strained by a movement of the outer ring 7 in the direction in which it causes the feed-wheels 14 to recede from the center of the wheel, whereby the ring 7 receives a tendency to return to the position in which the feed-wheels are nearest to the center of the ring 6. Said ring 7 is provided with a handle 21, by which it may be oscillated manually.

A suitable feed-trough 22 is arranged in front of the machine and provided with an endless apron or feed-belt 23, which serves to feed the ears of corn endwise to the curved guide-plates 11, where the ears of corn are engaged by the feed-wheels 14 and started through the machine.

In the side frames 4 5 are journaled shafts 24, which carry suitable feed-wheels 25, such as are described in said Letters Patent hereinbefore referred to, and at the outer ends of said shafts 24 are miter-wheels 26 and beveled wheels 27. The latter are engaged by similar wheels 28 on a shaft 29, which is mounted in suitable bearings, as at 30, and at its rear end is provided with a fast pulley 31 and a loose pulley 32. A longitudinally-movable rod 33 is mounted in suitable bearings 34 and is parallel with the shaft 29. Said shaft 33 is provided at its rear end with a belt-shifter 35, by means of which a driving-belt 36 may be engaged with either the fast pulley or the loose pulley. Hence the machine may be thrown into or out of operation by a longitudinal movement of the shaft 33. To the front end of the said shaft 33 is attached a suitable handle 37, by means of which it may be readily operated from the front side of the machine. Said shaft is provided with suitable adjusting-openings 38, which register successively with an opening in the front bearing 34. A suitable locking-pin 39 may be placed in said registering openings in order to lock the shaft 33 in either position desired. Power is conveyed from the shaft 29 to the upper shafts 24 by the beveled gears 27 28 and is conveyed from the upper shafts 24 to the lower shafts 24 by the spur-gears 26.

An idler-gear 40 engages the front spur-gear 26. The feed-belt or apron 23 is actuated by a roller 41 on a shaft 42, which shaft is provided with a spur-gear 43, that engages the idler 40. Thereby power is communicated to said shaft 42, as will be understood.

At the rear ends of the shafts 13 are spur-gears 44, which engage a spur-wheel 45, that turns loosely on a sleeve or tube 46. The latter is secured centrally in the rear-frame ring 3, and through the said tube or ring, the front end of which is flared outwardly and enlarged, as shown, are discharged the cobs from the machine after the grains have been cut and the meats and milk thereof extracted therefrom. A beveled wheel 47 rotates with the wheel 45 and is engaged by a beveled pinion 48 on a shaft 49. The said shaft is journaled in suitable bearings 50 at the rear end of the machine and is provided at its outer end with a miter-wheel 51, which engages a similar wheel 52 on the power-shaft 29. Thereby power is conveyed from the shaft 29 through the shaft 49 and connecting-gears to the wheel 45 and from the latter to the shafts 13 by the gears 44, as will be understood.

Disposed between the first and second pairs of feed-wheels 25 is a cutter-wheel 53, which is provided with peripheral spurs 54. The latter are engaged by spur-wheels 55 on the shafts 13. The wheel 53 is supported and rotated by the spur-gears 55, the latter being provided with annular flanges 56 on opposite sides, which overlap the sides of the cutter-wheel 53, and thereby maintain the latter in the position shown in Figs. 1 and 2 and against movement longitudinally of the machine.

The said cutter-wheel is provided on its rear side with an annular plate 57 and on opposite sides has inwardly-extending radial arms 58. Segmental guides 59, the front ends of which are flared outwardly, as at 60, are provided at their rear sides with supporting-arms 61. The latter, near their outer ends, are pivotally mounted on pins 62, carried by the arms 58. The said arms 61 have openings 63, through which said pins 62 extend, and said openings 63 being sufficiently large to admit of the segmental guides opening from each other and from the center of the cutter-wheel. Springs 64, which are connected to the arms 61 and to the inner side of the cutter-wheel, normally maintain said segmental guides 59 in the positions shown in Fig. 4. On the rear side of each of the said segmental guides 59 is secured a segmental cutter or knife 65, which is provided with blade-like and preferably serrated cutting edges 66, as shown in Figs. 4 and 7. Said cutters 65 are removable or detachable from the segmental guides and may be secured thereto by any suitable means, screws 67 being here shown for this purpose. The arms 61, which carry the segmental guides and the cutters, are supported in a vertical position by the annular plate 57 on the rear side of the cutter-wheel 53.

One or more of the cutter-wheels may be employed, as may be desired; but only one of them is here shown on the machine.

In rear of the cutter-wheel 53 and disposed at suitable distance apart are roller-wheels 68, which are similar in construction to the cutter-wheel 53 and are revolved and supported by wheels 69, which are identical in construction with the wheels 55 and are likewise mounted on and rotated by the shafts 13. Each of the roller-wheels 68 carries a pair of rollers 70, the faces of which are concaved, as shown in Fig. 6. Said rollers 70 are mounted in arms 71. The outer ends of said arms are pivotally connected to the rims of the wheels 68, as at 72. Springs 73 are connected to said arms 71, as shown in Fig. 6, and serve to press the rollers 70 toward each other. The rollers 70 of the respective roller-wheels 68 are disposed at right angles to each other.

Scrapers 74, which are similar to the scrapers heretofore employed, are disposed between the rear roller-wheel 68 and the tube or sleeve 46.

In operation the ears of corn which are fed longitudinally through the machine pass between the segmental guides 59, which being carried by the revoluble cutter-wheel 53 rotate around each ear of corn as the latter moves longitudinally, and the cutters 65 serve to cut and split the shells or skins which form the outer integument of the grains. The rollers 70, which are carried by the revoluble roller-wheels 68, operate subsequently on the corn and serve to squeeze and press out the pulp and kernels constituting the meats of the grains and also the milk, while leaving the skins or hulls, which are indigestible, on the cobs. The scrapers 74, which operate subsequently to the roller-wheels, complete the process of removing the meats and milk, but do not scrape the skins or hulls of the grains from the cobs. Hence the machine is adapted for expeditiously preparing corn for canning, and the finished product is of the highest quality. A hopper 75 is disposed below the machine-frame and receives the cut corn. An inclined plate 76, secured on the machine-frame, discharges into said hopper, and the latter discharges into a trough 77, in which operates a suitable endless conveyer 78.

A shield 79 is secured on the front side of the machine-frame and is disposed immediately in advance of the guide-plates 11 and prevents the fingers of the operator from becoming caught by the feed-wheels 14 in the event that the operator should take hold of an ear of corn which is caught by said feed-wheels 14 and may have become lodged between the guide-plates. By imparting oscillating motion to the ring 7 by means of the handle 21 said guide-plates and feed-wheels may, as before described, be operated to release and start an ear of corn which may have become lodged between said guides and feed-wheels.

A shield 80 (indicated in dotted lines in Fig. 2) is disposed over the gears 27 28 to cover the same and prevent the clothing of the operator from being caught by said gears. A suitable shield 81 is disposed on one side of the machine and extends downward to the outer side of the hopper 75, thereby incasing the parts of the machine which are directly operative on the ears of corn.

Having thus described our invention, we claim—

1. In a machine of the class described, the combination of means to feed an ear of corn endwise, a revoluble element through which the ear passes, and a spring-pressed arm attached to and carried by said revoluble element, said spring-pressed arm having one or more cutters arranged and operating to split the grains circumferentially of the ear, and a guide to bear on the ear, substantially as described.

2. In a machine of the class described, the combination of means to positively feed an ear of corn endwise, initial means operating to split the grains, and spring-pressed centering-arms carried by a revolving element and carrying squeezing-rollers acting on the circumference of the endwise-moving ear to express the meat and juices from the split grains, substantially as described.

3. In a machine of the class described, the combination with means to feed an ear of corn endwise, a plurality of revoluble wheels, disposed one in rear of another, and each having a central opening and spring-pressed centering-arms, said arms of the said front wheel having flared segmental guides 59 at their inner ends and cutter-blades 65 at the rear sides of said guides, and said arms of the rear wheels having rollers 70, all constructed and designed to operate, substantially as described.

4. In a machine of the class described, the combination of a fixed-ring frame, arms pivotally connected thereto, guide-plates and feed-wheels carried by said pivotal arms, means to operate said feed-wheels, an oscillatory ring connected to said pivoted arms, and a shield 79, attached to said fixed ring and disposed in front on said guide-plates and feed-wheels, substantially as described.

5. In a machine of the class described, in combination with means to feed an ear of corn endwise, the wheel 53 having the central opening, the annular plate 57 on its rear side and the radial arms 58, supporting-arms 61 pivotally connected to said radial arms, and disposed on the front side of said annular plate, said supporting-arms having flared segmental guides 59 at their inner ends, and cutter-blades 65 secured to the rear sides of said guides, and springs 64 attached to said wheel and bearing against said supporting-arms, and means to rotate said wheel, substantially as described.

6. In a machine of the class described, the combination of means to positively feed an ear of corn endwise, a revoluble element through which the ear passes, and a spring-pressed arm attached to and carried by said revoluble element, said spring-pressed arm having one or more cutters arranged and operating to split the grains circumferentially of the ear, and a guide to bear on the ear, with spring-pressed centering-arms carried by a revolving element and carrying squeezing-rollers, acting on the circumference of the endwise-moving ear to express the meat and juices from the split grains, substantially as described.

In testimony that we claim the foregoing as our own we have hereto affixed our signatures in the presence of two witnesses.

CLARENCE M. FENTON.
ADAM WODE, Jr.

Witnesses:
D. E. DONOVAN,
E. FRANK READ.